United States Patent

[11] 3,600,969

| [72] | Inventor | Alfred Pitner<br>Paris, France |
|---|---|---|
| [21] | Appl. No. | 842,241 |
| [22] | Filed | July 16, 1969 |
| [45] | Patented | Aug. 24, 1971 |
| [73] | Assignee | Rueil Nadella<br>Malmaison, France<br>a part interest |
| [32] | Priority | July 29, 1968 |
| [33] | | France |
| [31] | | 160,938 |

[54] STEERING CONTROL MECHANISM
7 Claims, 3 Drawing Figs.

[52] U.S. Cl. .................................................. 74/492,
64/17 A
[51] Int. Cl. ..................................................... B62d 1/16
[50] Field of Search .......................................... 74/492,
493, 490; 64/6, 17 A; 277/206.1

[56] References Cited
UNITED STATES PATENTS

| 2,272,900 | 2/1942 | Saurer .......................... | 64/11 |
| 2,865,222 | 12/1958 | Bachman ..................... | 74/493 |
| 2,873,132 | 2/1959 | Tanner ........................ | 277/206.1 UX |
| 3,267,696 | 8/1966 | Sieja ............................ | 64/11 |
| 3,446,507 | 5/1969 | Ulics ........................... | 64/17 |

*Primary Examiner*—Milton Kaufman
*Attorneys*—Robert E. Burns and Emmanuel J. Lobato ABSTRACT: A steering control mechanism in which the steering wheel is carried by a steering shaft element which is connected to the rest of the steering control shaft structure through a universal joint. This joint has a sealing ring interposed between each cross trunnion shoulder and a flange on a needle bearing cup engaged in the corresponding yoke branch. The sealing ring is so arranged and adapted as to perform the function of a shock absorber for transverse vibrations and shocks.

PATENTED AUG24 1971 3,600,969

STEERING CONTROL MECHANISM

The present invention relates to a steering control mechanism wherein the most usual arrangement consisting of a single shaft connecting the steering wheel to the steering box is replaced by a segmented shaft comprising a main center portion whose upper end is connected by a universal joint to a shaft element constituting the steering wheel support.

Such a system having a universal joint introduces two factors which intervene in the transverse reactions liable to be transmitted to the steering wheel.

The use of a universal joint considerably decreases the rigidity of the assembly since there is employed instead of a beam in a single piece solidly embedded at both ends, a pivotal system which, in particular, considerably decreases the rigidity of the assembly of the parts mounting the steering wheel in the upper part.

Moreover, very often for convenience of assembly the center part of the segmented shaft, instead of being tubular, is solid and has a substantially greater linear mass since it generally comprises larger sections and, in a certain part of the length, two superimposed profiles for sliding and driving.

Consequently, the center part has a large mass whose upper bearing point has rather poor rigidity. More usually, a second universal joint is provided for connection to the steering box so that the rigidity of the lower bearing point is also rather poor.

During use of the vehicle, there occurs vibrations or shocks which come from both the drive means and the suspension means and which are transmitted to the steering wheel at least in the form of components which are transverse relative to the axis of rotation of the mechanism. These vibrations are extremely unpleasant since they may be continuous as opposed for example to sudden shocks in the circumferential direction due to unevenness, namely hollows or projections, in the road along which the vehicle is traveling.

The object of the invention is to eliminate these transverse vibrations or shocks. The invention more particularly relates to the case in which each trunnion of the universal joint is capped by a needle cup which compresses a sealing ring between the flange of the cup and a shoulder on the trunnion.

The invention provides a steering control mechanism wherein the end of each needle cup is spaced from the corresponding end face of the trunnion and the shape, the characteristics of hardness and resilience, and the rate of compression adopted for the sealing ring are adapted to result in the sealing ring performing the function of a shock absorber for transverse vibrations and shocks.

Experience has shown that such an arrangement, while it ensures a certain suspension of the masses located below the upper pivot, precludes transmission to the hands of the driver of vibrations which are liable to be applied to the steering box or which could start in the center part of the shaft.

As concerns the shape of the sealing ring, it has been found advantageous to employ a quadrilobar section whose contour defines a deformed square in that the lobe which is adjacent both the trunnion and the flange of the cup is offset towards the shoulder of the trunnion relative to other lobe which is adjacent the flange of the cup. This arrangement avoids any risk of introduction of the part of the sealing ring nearest the cup between the edge of the flange pressing the sealing ring and the cylindrical face of the trunnion which would otherwise render the compression of the ring unreliable. This precaution is advantageous in that this compression must be predetermined if the shock absorbing function of the ring is to be correctly performed.

Further features and advantages of the invention will be apparent from the ensuing description with reference to the accompanying drawing.

Figures 1, 2:
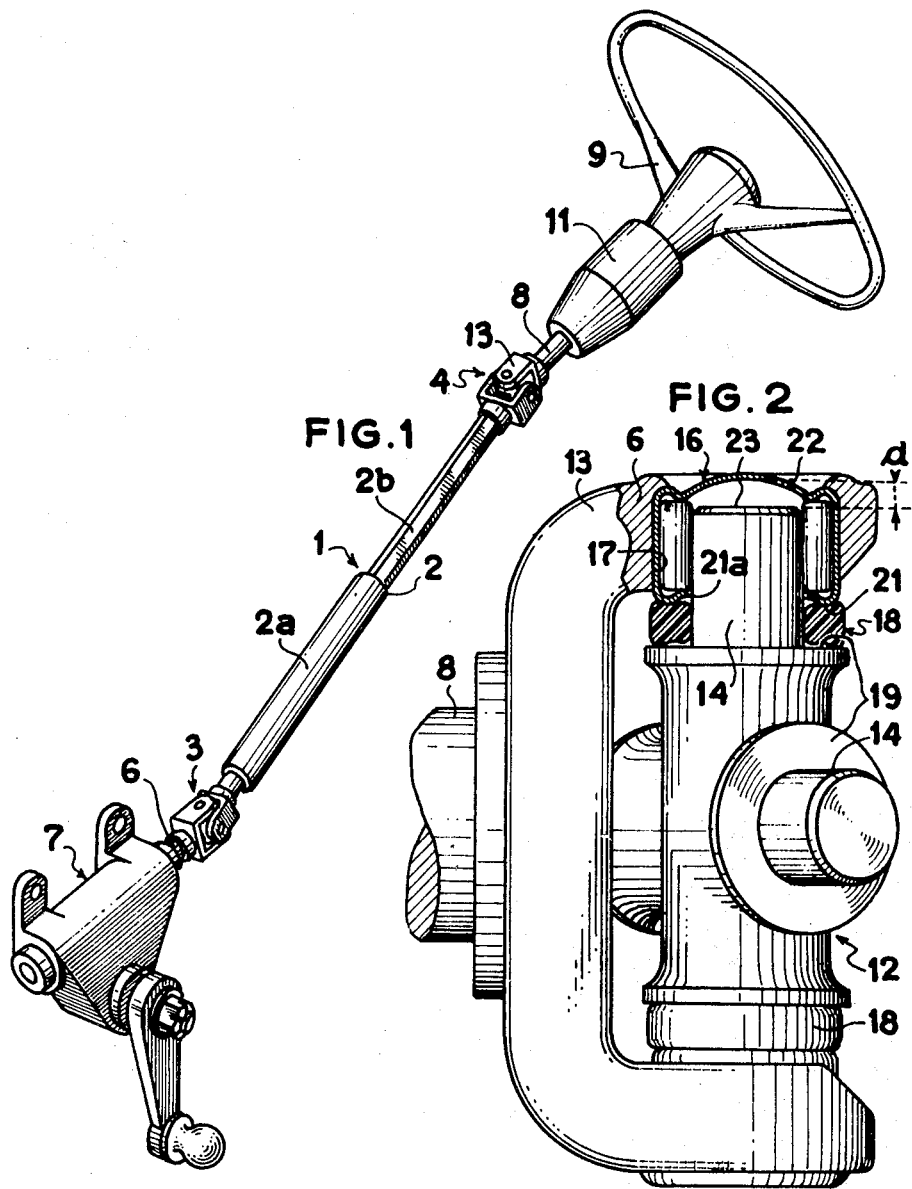
FIG. 1 is a diagrammatic perspective view of a steering control mechanism in which the steering wheel is connected to the steering box through two universal joints.
fig. 2 is an elevational view, partly in section, on an enlarged scale showing the principle of the construction of the universal joints employed in the mechanism shown in FIG. 1.

The steering control mechanism shown in FIG. 1 comprises a steering control shaft 1 which is segmented in that it comprises a center part 2 connected at both ends through two universal joints 3, 4 to a shaft element 6 which constitutes the input shaft of the steering box 7 and to a shaft element 8 which supports the steering wheel 9 and is journaled in a mount 11 fixed to the body of the vehicle (not shown).

The center part 2 of the shaft is shown by way of example to be of a telescopic construction and comprises two parts $2^a$, $2^b$, which are slidable relative to each other while being capable of transmitting the torque exerted by the steering wheel 9 owing to their prismatic cross-sectional shape.

Each of the yokes of the universal joints 3, 4 is connected in the same way to the corresponding cross 12. According to the assembly shown in FIG. 2 concerning the mounting of the cross 12 in the yoke 13 connected to the shaft element 8 carrying the steering wheel 9, the two opposed trunnions 14 of the cross 12 are capped by a needle cup 16 which is fitted in the corresponding bore 17 of the yoke 13. The cup is sealed by a sealing ring or element 18 of elastomer which has a quadrilobar section and is gripped between a shoulder 19 on the trunnion and a radial flange 21 formed at the free end of the cup. The relative dimensions measured along the axis of the trunnions 14 of the cup 16 of the ring 18 and of the trunnion, starting at the shoulder 19, are such that the ring 18 constitutes an abutment and centering means which, upon assembly and owing to the compression it undergoes for affording the seal, limits the travel of the cup 16 when fitting in the yoke,/ the end wall 22 of the cup 16 being finally spaced an appreciable distance $d$ from the end face 23 of the trunnion.

Figure 3:
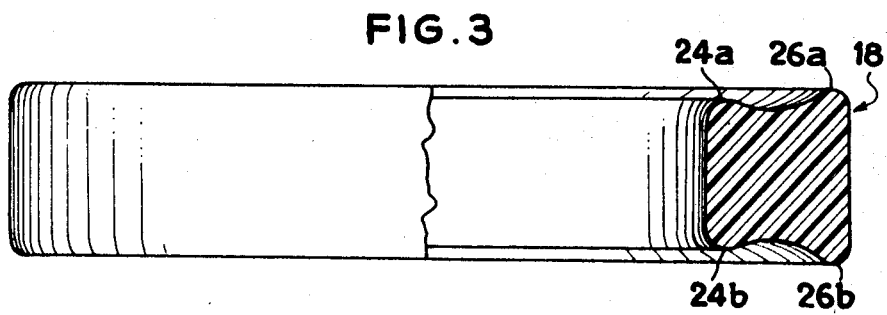
FIG. 3 is an elevational view, partly in cross section, of a sealing ring of utility in the universal joint shown in FIG. 2.

By way of example, the shape of the sealing ring or element 18 is shown more clearly in FIG. 3. The quadrilobar shape of the section of this ring approaches that of a square. However, on the side thereof in contact with the cylindrical face of the trunnion 14, the section of the ring has two lobes $24^a$, $24^b$ which are offset towards the radial median plane of the ring relative to the two opposed lobes $26^a$, $26^b$ remote from the trunnion 14. The advantage of this arrangement is that for high compressions there is no risk of the lobe $24^a$ becoming inserted between the edge $21^a$ of the flange 21 of the cup 16 and the cylindrical face of the trunnion 14 so that there can be no modification in the characteristics of the compression of the ring 18. This factor is important in that the sealing ring 18 performs, according to the invention, a shock absorbing function as concerns not only transverse vibrations and shocks applied to the steering box produced by the drive or suspension means of the vehicle, but vibrations produced in the center of the shaft. For this shock absorbing function, it is well that the elastomer constituting the ring undergo a compression which is correctly determined in accordance with the characteristic of hardness which is relatively high (of the order of 81 Shore A) and with the characteristic of resilience.

It will be understood that it is possible to replace the universal joint 3 connecting the shaft elements $2^a$ and 6 by a flexible coupling (for example having a rubber disc) or by a rigid coupling.

Having now described my invention what I claim as new and desire to secure by Letters Patent is:

1. In a steering control mechanism comprising a steering box connected to a steering wheel through a steering control shaft structure having an axis of rotation and a center part whose upper end is connected to a shaft element carrying the steering wheel by a universal joint comprising two yokes mounted on four trunnions of a cross through needle bearings, each of which bearings has an axis of rotation and includes a needle cup prevented from moving axially away from said axis of rotation of said shaft structure and having an end flange adjacent a shoulder on the corresponding trunnion and an elastomeric sealing ring interposed between each flange and each shoulder; the feature that each sealing ring is in a compressed condition in a direction parallel to the axis of rotation of the corresponding bearing and said cross is adapted and arranged to be capable of moving axially of each bearing but incapable of axially encountering and striking the bearing, in opposition to resilient reactions exerted by said compressed sealing rings on the corresponding journal shoulders, whereby said sealing rings are capable of performing the function of shock absorbers for vibrations and shocks transverse to the axis of rotation of said steering control shaft structure.

2. A mechanism as claimed in claim 1, wherein said sealing ring has a quadrilobar cross-sectional shape.

3. A mechanism as claimed in claim 2, wherein the lobe of the quadrilobar section which is adjacent both the corresponding trunnion and said flange of the corresponding cup is offset towards offset towards shoulder of said trunnion relative to another lobe adjacent said flange.

4. A mechanism as claimed in claim 3, wherein said sealing ring has a plane of symmetry orthogonal to said axis of rotation of the corresponding bearing cup.

5. A mechanism as claimed in claim 1, comprising a flexible coupling connecting a lower end of said center part of said steering control shaft structure to a shaft element of said steering box.

6. A mechanism as claimed in claim 1, further comprising a second universal joint connecting the upper end of said center part to said shaft element carrying said steering wheel and connects a lower end of said steering control shaft structure to an input shaft element of said steering box.

7. In a steering control mechanism comprising a steering box connected to a steering wheel through a steering control shaft structure having an axis of rotation and a center part whose upper end is connected to a shaft element carrying the steering wheel by a universal joint comprising two yokes mounted on four trunnions of a cross through needle bearings, each of which bearings has an axis of rotation and includes a needle cup prevented from moving axially away from said axis of rotation of said shaft structure and having an end flange adjacent a shoulder on the corresponding trunnion and an elastomeric sealing ring interposed between each flange and each shoulder; the feature that each sealing ring is of an elastomeric material having a hardness of substantially 81 Shore A and in a compressed condition in a direction parallel to the axis of rotation of the corresponding bearing and said cross is adapted and arranged to be capable of moving axially of each bearing but incapable of axially encountering and striking the bearing, in opposition to resilient reactions exerted by said compressed sealing rings on the corresponding journal shoulders, whereby said sealing rings are capable of performing the function of shock absorbers for vibrations and shocks transverse to the axis of rotation of said steering control shaft structure.